Aug. 26, 1941.                D. S. DEVOR                2,253,931
                             BUMPER STRUCTURE
                          Filed March 29, 1940
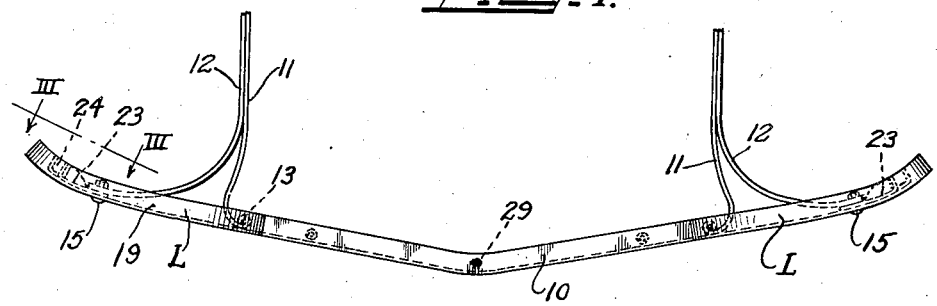
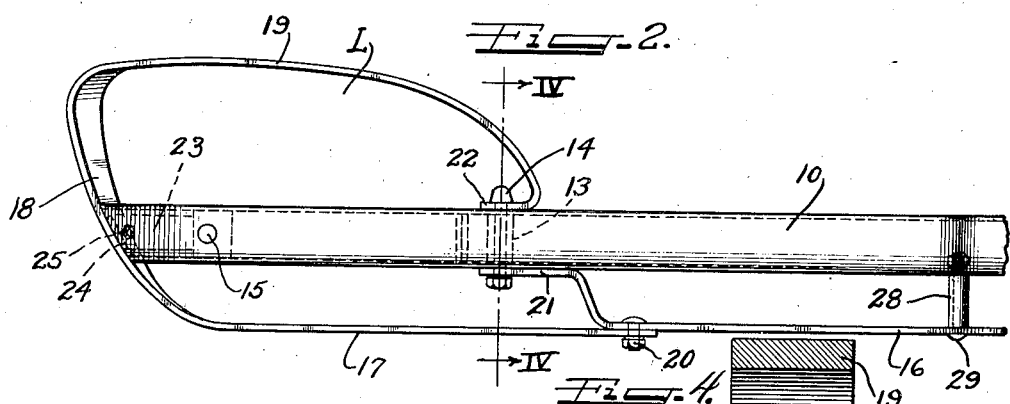
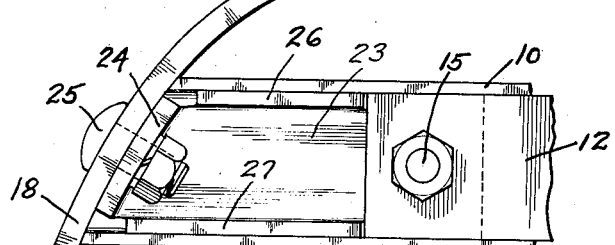
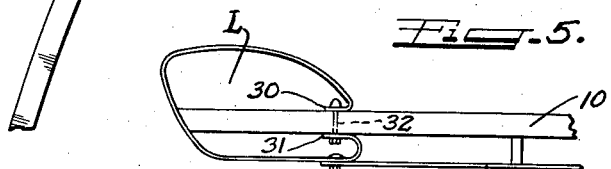
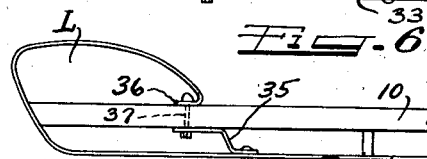
Inventor
DON S. DEVOR.

Patented Aug. 26, 1941

2,253,931

UNITED STATES PATENT OFFICE 2,253,931

BUMPER STRUCTURE

Don S. Devor, Detroit, Mich., assignor to Houdaille-Hershey Corporation, Detroit, Mich., a corporation of Michigan Application March 29, 1940, Serial No. 326,553

3 Claims. (Cl. 293—55)

This invention relates to bumper structure for automobiles particularly front bumper structure for protection of automobile parts at the front of the vehicle such as the radiator grillwork, lamps and fenders.

The general object of the invention is to produce an improved guard structure arrangement and its assembly with the impact bar of a bumper.

More in detail an important object is to produce a structure in which guard elements are in the form of loops bent from flat bar stock and secured to the end portions of a bumper impact bar to be partially above and partially below the impact bar to afford protection for the fenders and lamps, and with the inner ends of the guard loops connected by a guard bar paralleling the impact bar for assisting the impact bar in protecting the radiator grillwork.

The invention also embodies other features of construction and arrangement and all the various features are incorporated in the structure disclosed on the drawing, in which drawing Figure 1 is a plan view of a bumper and guard assembly:

Figure 2 is an enlarged front elevation of the left half of the assembly shown in Figure 1;

Figure 3 is an enlarged section on plane III—III of Figure 1;

Figure 4 is an enlarged section on plane IV—IV of Figure 2; and

Figures 5 and 6 show modified arrangements.

On the structure shown the impact bar 10 is of channel shape, and to support the impact bar from the vehicle body, left and right pairs of inner and outer supporting bars 11 and 12 may be provided, these bars being adapted to be secured at their rear ends to the side frames of the vehicle chassis in a manner well known in the art. At their forward ends the inner supporting bars 11 are deflected a distance laterally inwardly and their ends bent around to form sleeves 13 for receiving bolts 14 extending through the upper and lower flanges of the bar 10 as clearly shown on Figure 4. The outer supporting bars 12 at their forward portions incline gradually laterally outwardly to extend between the flanges of the impact bar and to be secured to the front wall of the bar as by suitable bolts 15, as more clearly shown by Figure 3. The bar 10 may be of bowed or V shape as shown by Figure 1.

The outer portions of the impact bar 10 are surrounded vertically by guard structure in the form of guard loops L which are shown as of substantially rhomboidal shape. The lower inner corners of the loops L are connected by a bar 16 extending below the impact bar 10, this bar 16 assisting the impact bar in protecting automobile parts such as the radiator grillwork, while the loops L afford protection for the fenders and lamps or other accessories mounted thereon.

In the arrangement shown on Figure 2, a single length of flat stock bar is bent to provide the lower leg 17 of the loop, the laterally outwardly extending end leg 18 of the loop, and the upper leg 19 of the loop. The lower legs 17 of the two loops are secured at their inner ends, as by bolts 20, to the guard bar 16 adjacent to the respective ends of the bar, the end portions of the bar being deflected upwardly and then laterally outwardly with the ends 21 engaging against the lower flange of the impact bar 10. The upper legs 19 of the loops extend a distance inwardly substantially horizontally and their inner portions then deflect gradually downwardly with their ends 22 deflected laterally outwardly for engaging against the upper flange of the impact bar opposite the ends 21 of the bar 16. Securing means such as bolts are applied through the ends 21 and 22 and the impact bar for securing the ends to the bar, and such bolts may be the bolts 14 which secure the supporting bars 11 to the impact bar, as clearly shown on Figure 4.

The end leg 18 of each loop extends across the corresponding end of the impact bar to be secured to a suitable fitting on the bar. As shown a fitting in the form of a plate 23 is provided in the rear side of the impact bar at each end thereof, the plate at its inner end extending between the front wall of the impact bar and the supporting bar 12 and is apertured to receive the bolt 15. At its outer end the plate is deflected rearwardly to form a supporting flange or lip 24 against which the outer leg 18 of the respective loop is secured as by means of a bolt 25. Upper and lower strengthening flanges 26 and 27 may be provided on the plate 23 for engaging with the flanges of the impact bar. The vertical plane of each loop preferably follows the vertical plane of the respective end portion of the impact bar which is surrounded by the loop, as clearly shown on Figure 1. The vertical plane of the guard bar 16 also preferably follows the vertical plane of the middle portion of the impact bar and as shown, the bar 16 at its middle point is spaced from the impact bar by a spacer sleeve 28 receiving a bolt 29 which extends through the bar 16, the sleeve, and the lower flange of the impact bar so that the bar 16 at its middle point will be rigidly secured to the impact bar.

Figures 5 and 6 show modified arrangements. As shown on Figure 5, the entire loop may be formed from a single piece of stock bar with the ends 30 and 31 at its inner side deflected laterally outwardly to receive between them the impact bar 10 and to be secured thereto as by a bolt 32 which may be the same bolt that secures the inner supporting bar 11 to the impact bar. The guard bar 33 would then be secured to and extend between the lower inner corners of the loops.

In the arrangement shown in Figure 6, a single length of bar 34 would have the loops formed at its ends, with brackets 35 secured to the bar 34 and to engage the under side of the impact bar in alignment with the deflected ends 36 of the upper legs of the loop to receive bolts 37, which bolts could be the same bolts which secure the impact bar to the supporting bars 11.

I thus produce a simple but efficient bumper and guard assembly which can be economically manufactured from stock material and economically and quickly assembled.

I do not desire to be limited to the exact construction and arrangement shown and described as changes and modifications may be made which would still come within the scope of the invention.

I claim as follows:

1. A bumper and guard assembly comprising a single continuous main impact bar of a length to extend entirely across the end of a vehicle, guard structure in the form of horizontally elongated loops disposed in the vertical plane of the end portions of said impact bar and surrounding said end portions to project above and below the same, the outer ends of said loops abutting against and being rigidly secured to the respective end edges of the impact bar, and means rigidly securing the inner ends of said loops to the top and bottom respectively of said impact bar, and a guard bar independent of said impact bar connecting the inner end of said loops.

2. A bumper and guard assembly comprising a continuous main impact bar of a length to extend across the end of a vehicle, a guard loop for each end portion of the impact bar located in the vertical plane of and surrounding the end portion to be spaced above and below the same, means securing the outer leg of each loop against the outer end of the respective impact bar end portion, and means securing the inner end of each loop to the impact bar, and a guard bar paralleling and spaced from the middle portion of said impact bar and secured at its ends to the inner ends of said loops.

3. A bumper and guard assembly comprising a single continuous bumper impact bar of a length to extend entirely across the end of a vehicle, a vertical guard loop for each end portion of the impact bar formed from a single length of metal bar and comprising an upper leg, a lower leg and an outer end leg, the outer end leg of each loop being secured against and to the outer end of the respective impact bar end portion, the upper leg of each loop being spaced above and in the vertical plane of the respective impact bar end portion with its inner end rigidly secured to the top of the impact bar, the lower leg of each loop being spaced below the corresponding impact bar end portion in the vertical plane thereof and with its inner end rigidly secured to the bottom of the impact bar.

DON S. DEVOR.